United States Patent [19]

Fricke

[11] Patent Number: 4,634,878
[45] Date of Patent: Jan. 6, 1987

[54] LASER DETECTOR WITH DISTANCE-TO-BEAM STRIP SENSOR

[75] Inventor: William C. Fricke, Sandy Hook, Conn.

[73] Assignee: The Perkin Elmer Corporation, Norwalk, Conn.

[21] Appl. No.: 740,933

[22] Filed: Jun. 3, 1985

[51] Int. Cl.⁴ .................. G01N 21/86; G01V 9/04
[52] U.S. Cl. .................. 250/560; 250/211 R; 356/28
[58] Field of Search .......... 356/28, 28.5, 4, 3; 324/175; 250/560, 211 R

[56] References Cited

U.S. PATENT DOCUMENTS 3,765,765 10/1973 Hefter ........................ 356/4
3,802,775 4/1974 Hughes ..................... 356/28.5
4,206,999 6/1980 Keller ......................... 356/28
4,572,664 2/1986 Hanson ..................... 356/28.5

FOREIGN PATENT DOCUMENTS 0020772 2/1979 Japan ......................... 356/28

Primary Examiner—David C. Nelms
Assistant Examiner—William L. Oen
Attorney, Agent, or Firm—Thomas P. Murphy; Edwin T. Grimes; Francis L. Masselle

[57] ABSTRACT

A laser detection system is disclosed. Optical means projects light scattered from a moving localized portion of the beam onto a photosensitive strip. Voltage applied across the strip causes the light generated electrons therein to move through the strip at the same rate as the scattered light from the moving localized portion of the beam projected onto the strip moves across the strip so that all the electrons generated in the strip are detected as an accumulated charge at one end thereof.

7 Claims, 1 Drawing Figure

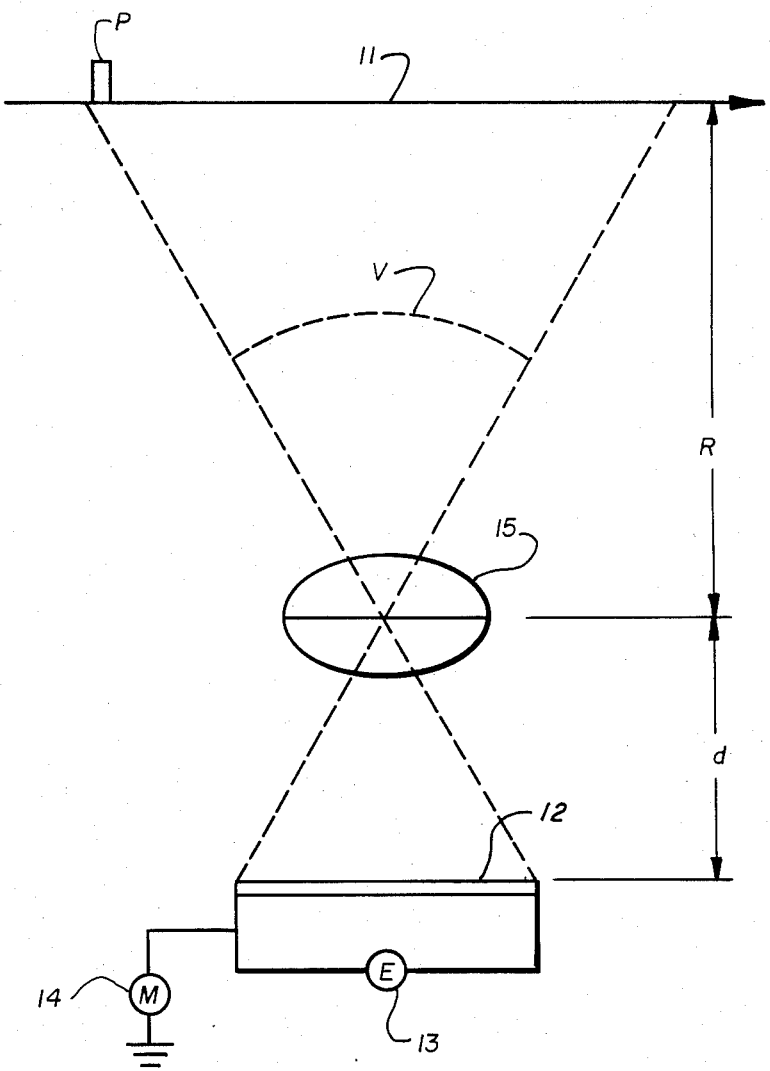

LASER DETECTOR WITH DISTANCE-TO-BEAM STRIP SENSOR

BACKGROUND OF THE INVENTION

Laser detection systems which are not positioned in the path of the laser beam rely on the detection of light scattered from a laser pulse or other time varying property of the laser beam as it passes through the field of view of the detection system. A serious problem associated with this method of laser detection is low signal to noise ratios caused by weak scattered laser light and by background radiation also present in the detectors field of view as the laser beam passes therethrough. In fact, the background radiation present in the field of view of the detection system may be so great as to make detection of the laser beam passing therethrough virtually impossible.

The present invention overcomes the foregoing mentioned problem and provides a detection system with a much higher signal to noise ratio than hitherto achievable.

BRIEF SUMMARY OF THE INVENTION

The present invention relates to a laser detection system which provides a much higher signal to noise ratio than presently existing laser detection systems. The laser detector system of the present invention substantially reduces background radiation effectively by viewing a small portion of the laser beam as it passes through the field of view.

Specifically, the present invention increases the signal to noise ratio by integrating the signal generated by a localized portion of the laser beam as that portion traverses the field of view of a sensor. The sensor comprises optical means for projecting scattered light from the localized portion of the laser passing through the field of view onto a photosensitive strip or detector. Voltage is applied across the photosensitive strip which causes the electrons generated in the strip to move at the same rate as the light moving across the strip thereby accumulating signal electrons as the light moves from one end of the strip to the other into a single packet of electrons which is detected by appropriate means located at the other end of the strip.

DESCRIPTION OF THE DRAWING

The FIGURE is a schematic illustration of the laser detection system of the present invention.

DETAILED DESCRIPTION

Referring now more particularly to the single FIGURE, there is shown in schematic representation the essential features of the present invention.

The line 11 represents the path of a laser or similar light beam whose presence is to be detected. Pulse P represents a pulse of a pulsed laser beam travelling across the field of view V from left to right at the speed of light C. While the laser detector of the present invention is described in terms of detecting a pulse, it should be noted that the present invention may function also to detect a continuous wave laser beam which has any type of time varying phenomena associated therewith.

Disposed at a predetermined distance beam path 11 is a photosensitive strip 12. The photosensitive strip 12 is of the type which generates electrons at the position along its length which is exposed to light. The strip 12 may be made of any photosensitive material such as mercury cadmium telluride or silicon and in a practical embodiment is one micron wide by fifty microns long. A d.c. voltage is applied across the length by a voltage source 13. Meter means 14 for measuring the accumulator charge of electrons is connected to one end of strip 12.

Optical means represented by converging lens 15 is disposed between line 11 and strip 12 at a distance R from line 11 and a distance d from strip 12 where d is the focal distance of lens 15.

As a laser pulse travels from left to right along line 11 in the field of view V, scattered light therefrom is projected onto strip 12 and travels from right to left on the surface of the strip 12 generating electrons within the strip 12 as the light travels thereacross. The image of the light travels right to left along the length of the strip 12 at a speed, S, where $$S = (dc)/R$$

where
d is the focal distance of lens 15
R is the distance from lens 15 to beam line V
C is the speed of light The voltage across the strip 11 as applied by source 13 is chosen such that the electrons produced by the projected optical signal from laser pulse P are swept along at the same speed as the light travels down the strip 12 accumulating as they go along until the total number of electrons generated collect at the left end of strip 12 where they are detected by meter 14. In other words, by properly choosing the focal length of lens 15 the motion of the image of the optical pulse across the surface of detector strip 12 can be made to exactly coinside with the movement of the pulse of charge (generated electrons) in the detector strip 12 thereby causing the total charge to be automatically integrated. The signal to noise ratio of the present invention is greatly enhanced due to this integration.

The present invention greatly narrows the effective field of view by viewing only a small portion of beam path 11 as laser pulse P traverses through the path 11, i.e., it views only the laser pulse or other time varying phenomena of a continuous wave laser. By reducing the effective field of view background radiation is greatly reduced which provides a high signal to noise ratio.

It should be noted also that the parameters of the present invention are dictated by the specific geometries involved. Therefore, a specific lens is required depending on the distances involved. The parameters are given by the equation above. Note that if an incorrect lens is used, the electronic charge will not be accumulated in a single narrow packet, but, rather, will be smeared out along the strip obliterating the desired information. Electronic charge from adjacent pulses may also overlap, further smearing the signal charge.

The detector strip 12 along with source 13 and meter 14 is a well known device known as a TED detector and also as a SPRITE (Signal Processing In The Element) detector is available from Ref.: Leftwich, Richard F., Magnavox Government and Industrial Electronics Co. E. O. Systems, 46 Industrial Avenue, Mahwah, N.J. and John M. Bullentine, Barr and Stroud, Inc., Caxton St., Anniesland, Glasgow G 131 Hz, Scotland. The novelty of the present invention resides in the combination and use of such a detector in a laser detection arrangement with lens 15 in a specific geometry in a novel combination.

Other modifications of the present invention are possible in light of the above description which should not be construed as placing any limitations on the present invention beyond those expressly set forth in the claims which follow.

What is claimed is:

1. A system for detecting a laser beam as it traverses a remotely located path, comprising:
   strip sensor means for generating electrons along its length in response to light;
   lens means disposed between the path and said strip sensor means for projecting scattered light from localized time varying phenomena of the laser traveling along the path onto said strip sensor means such that an image of the scattered light moves down the length of said strip sensor means at a speed related to the speed of light;
   voltage source means connected to said strip sensor means providing a voltage across the length of said strip sensor means causing electrons generated therein to travel the length of said strip sensor at the same speed as the light projected thereon by said lens means;
   meter means connected to the end of said strip sensor means for detecting the charge at said end caused by the accumulation of electrons at said end.

2. A system according to claim 1 wherein said scattered light from said time varying phenomena travels down the length of said strip sensor means opposite to the direction said time varying phenomena of the laser travels along its path.

3. A system according to claim 2 wherein the speed at which the light projected onto said strip sensor means travels equals (dc)/R
   where d is the focal distance of said lens means and distance between said lens means and said strip sensor means, R is the distance between said lens means and the path and C is the speed of light.

4. A system according to claim 3 wherein said time varying phenomena are pulses of a pulsed laser.

5. A system according to claim 3 wherein said time varying phenomena exist in a continuous wave.

6. A system according to claim 3 wherein said strip is made of mercury cadmium telluride.

7. A system according to claim 3 wherein said strip is made of silicon.

* * * * *